United States Patent [19]

Shinmyo et al.

[11] 4,250,456
[45] Feb. 10, 1981

[54] DEVICE FOR DEMODULATING PSK-FM DOUBLE MODULATED CARRIER SIGNALS

[75] Inventors: Saburo Shinmyo; Yoichi Tan, both of Tokyo, Japan

[73] Assignee: Nippon Electric Co., Ltd., Tokyo, Japan

[21] Appl. No.: 20,588

[22] Filed: Mar. 14, 1979

[30] Foreign Application Priority Data

Mar. 14, 1978 [JP] Japan .................................. 53-29599

[51] Int. Cl.$^3$ .............................................. H03D 3/00
[52] U.S. Cl. ...................................... 329/50; 329/104; 329/110; 370/10; 370/110; 375/86; 455/210; 455/216
[58] Field of Search ................. 329/50, 104, 110, 122, 329/123, 134; 332/21, 22; 455/205, 208, 210, 214, 216; 370/11, 110; 375/86

[56] References Cited

U.S. PATENT DOCUMENTS

| 3,603,882 | 9/1971 | Wilson | 332/22 X |
| 3,835,404 | 9/1974 | Nakamura et al. | 329/104 |
| 4,110,706 | 8/1978 | Matsumoto et al. | 329/104 X |

Primary Examiner—Siegfried H. Grimm
Assistant Examiner—Edward P. Westin
Attorney, Agent, or Firm—Sughrue, Rothwell, Mion, Zinn and Macpeak

[57] ABSTRACT

A demodulator for PSK-FM double modulated carrier signals in which the carrier signal is $2^N$ phase modulated by a main signal and frequency modulated by a sub-signal. A clock component is extracted from the received double-modulated carrier signal and the carrier signal sampled in accordance therewith. The amplitude of the output of the sampling gate is limited prior to frequency multiplication by $2^N$. A frequency modulated component is then demodulated from the multiplied signal.

1 Claim, 6 Drawing Figures

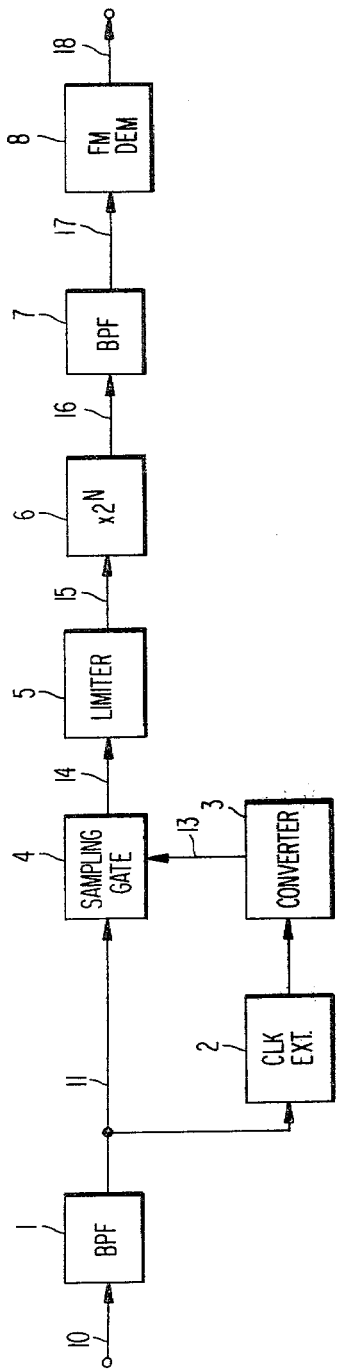
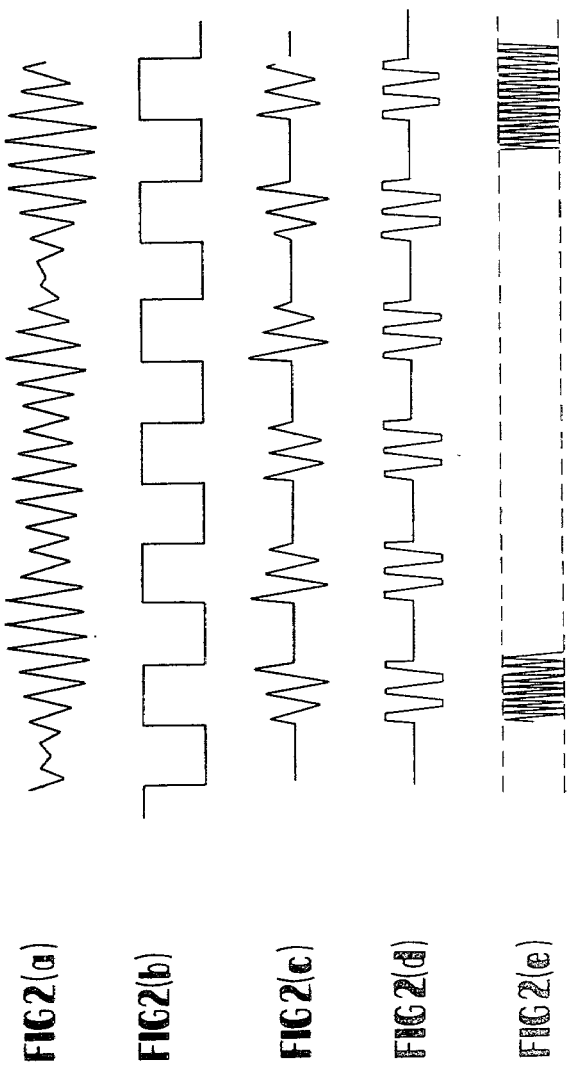

DEVICE FOR DEMODULATING PSK-FM DOUBLE MODULATED CARRIER SIGNALS

BACKGROUND OF THE INVENTION

The invention relates to a device for demodulating PSK-FM double modulated carrier signals, wherein a carrier wave multiphase-modulated by a main signal is frequency-modulated by a SC (service channel) sub-signal.

In a digital communication link, it is imperative that sub-signals for use in supervising and controlling the link for use in a control line be transmitted through the link separately from the main signals. The transmission systems of the type are generally classified into two categories. In one, sub-signals are transmitted by stuffing pulses into the main signal in a time-division fashion. In the other, a PSK-FM double modulated carrier wave is transmitted in which a carrier wave multiphase-modulated by the main signal is frequency-modulated with a sub-signal. For example, see the publication by Y. Tan et al., "The 8-Level PSK Modem with Cosine Roll-Off Spectrum for Digital Microwave Communications", ICC'76 Conference Record, pp. 29-13 to 29-18.

The first category of the system is adapted for transmitting sub-signals of an improved quality but requires an expensive demodulator for the main signal which must be provided in a repeater station in order to obtain sub-signals when it is otherwise not required that the main signals be demodulated. In the system of the second category in which the modulation system for the main signal differs from that for the sub-signal, a less costly device for demodulating the sub-signals alone may be used in a repeater station. The latter system therefore is advantageous for a long-distance link which requires plural repeater stations. On the transmitting side in the second system, a carrier wave phase-modulated by the main signal and a transmitting local oscillation signal frequency-modulated by the sub-signal are superimposed by an up-frequency converter for transmission. At the receiving side, the main signal is demodulated by a phase-demodulator for the main signal, for example, a phase synchronizing demodulator, and the sub-signal is extracted as an APC (automatic phase control) signal from a carrier wave regenerating PLL (phase-locked loop) circuit included in the phase synchronizing demodulator. This system operates on the principle that the sub-signal is transmitted by FM-modulating the multiphase-modulated carrier wave, that the FM carrier wave is reproduced by a carrier wave regenerating circuit, and that the PLL circuit operates as an FM demodulator. This type of system is described in the publication referenced above and the publication by Y. Tan et al., "2-Ghz Band Digital Radio Equipment Employing 8-Level PSK with Cosine Roll-Off Spectrum Shaping", ICC'78 Conference Record, pp. 33.3.1 to 33.3.5.

Such carrier signal regenerating circuits as used in phase demodulators are largely classified into:

(a) reverse modulation system as shown by U.S. Pat. No. 4,110,706, and W. R. Bennett et al., "Data Transmission", McGraw Hill Book Co., New York, 1965, pp. 253, (b) a "Costas" system as shown in FIG. 5 of the first-mentioned publication by Y. Tan et al. and U.S. Pat. No. 3,983,499, (c) multiplying system as shown for example in FIG. 13-1 of the referenced Bennett et al. book.

When employed as demodulators for sub-signals, the systems (a) and (b) cannot reproduce a carrier signal without using a demodulated main signal. Accordingly, these systems disadvantageously require a detection circuit for demodulating a main signal even in the case where demodulation of sub-signals alone is desired as in the case of an IF through repeater station as in the second-mentioned Y. Tan et al. publication. In the system shown in referenced U.S. Pat. No. 4,110,706, a carrier signal component can theoretically be reproduced by $2^N$-fold frequency multiplying a $2^N$ (N=a positive integer)-phase modulated signal. Accordingly, an extra main signal need not be reproduced upon reproduction of the carrier signal unlike in the systems (a) and (b). In the multiphase modulation, particularly for $N \geq 3$ in which a transmitted signal is subjected to strict bandwidth limitations as in the roll-off shaping, the proportion of correct phase information in the time slot of a carrier signal drastically decreases due to intersymbol interference casued by the bandwidth limitation. This results in an appreciable lowering of the ratio of desired carrier signal components after multiplication due to undesirable clutter components.

Increases in phase states result in increases in the number of multiplications required, as well as requiring a multiplier having a wider bandwidth, as the bit rate of the main signal increases. Under such conditions, difficulties are encountered, because of multiplier limitations, in employing reproduced carrier signals as carrier signals for demodulating the main signal as well as the sub-signal unless a number of additional circuits are provided, as disclosed in U.S. Pat. No. 3,835,404. However, as the circuit disclosed in this patent includes a sampling circuit and a limiter in the stages after the multiplier, the bandwidth problems of the multiplier are not ameliorated. None of the portions, in which the ratio of desired signals to undesirable signals is lowered because of the multiplier limitations, can be removed by sampling. For example, the portions of time containing cross-talk in which undesired clutter components arise during portions containing no phase information, as in the vicinity of a phase-change point or in the vicinity of a data-change point, are multiplied and the components thus multiplied exert an influence upon the portions containing phase information, namely the phase-arranged portions. A carrier signal reproducing circuit may be provided for reproducing a carrier signal of an improved quality for demodulation of the main signal, as referenced in U.S. Pat. No. 3,835,404. However, no description is given as to reproduction of sub-signals from a PSK-FM double-modulated carrier signal.

SUMMARY OF THE INVENTION

Accordingly, it is an object of the present invention to provide a device for demodulating a PSK-FM double-modulated carrier signal which eliminates the above-described drawbacks.

According to the present invention, there is provided a demodulator wherein double-modulated carrier signals, in which a carrier signal is $2^N$ (N is a natural number)-phase-modulated by a main signal and then frequency-modulated by a sub-signal, are demodulated for extraction of the sub-signal. The demodulator further includes means for extracting a clock component from the double-modulated carrier, signal means for sampling the double-modulated carrier signal according to the output of the clock component extracting means, means for limiting an amplitude of the output of the sampling means, means for frequency-multiplying the output of the amplitude limiting means by $2^N$, and means for demodulating a frequency-modulated signal from the frequency-multiplying means.

BRIEF DESCRIPTION OF THE DRAWINGS

The present invention will be described more in detail with reference to the accompanying drawings.

FIG. 1 is a block diagram of a sub-signal demodulating device according to the present invention; and, FIG. 2 shows examples of waveforms at various points of the demodulating device in FIG. 1.

DESCRIPTION OF THE PREFERRED EMBODIMENTS

Referring to FIG. 1, an input noise component included in a $2^N$-phase, PSK-FM double modulated carrier signal 10, such as shown in FIG. 2(a), is removed therefrom by a receiving bandpass filter 1. A clock component 12 is extracted from an output signal 11 of filter 1 by a clock extracting circuit 2. The extracted clock signal is synchronized and shaped in a waveform and level converter 3 to produce a sampling signal 13 of the form shown in FIG. 2(b). Circuit constructions suitable for extracting circuit 2 and clock synchronizing circuit 3 are described in the publication by W. R. Bennett, "Statistics of Regenerative Digital Transmission", *B.S.T.J.*, November 1958, pp. 1514, with particular reference to FIG. 7 thereof.

The output signal 11 from filter 1 is coupled to a sampling gate circuit 4. In sampling gate circuit 4, only the portion of output signal 11, in which phase information is properly maintained, namely the central portion of a bit, is extracted by sampling signal 13, producing thereby a signal 14 as shown in FIG. (2c). The signal 14, containing a amplitude-modulated (AM) component, is fed to a limiter 5. Limiter 5 compresses the amplitude-modulated portion without affecting phase information. An output signal 15 of limiter 15 has a waveform as shown in FIG. 2(d). Signal 15 is regarded as an ideal phase-modulated signal in that phase information is properly maintained and no variation in amplitude occurs. If the signal 15 is frequency-multiplied by $2^N$ by a multiplier 6, a carrier wave component 16 of the modulated wave 10 is regenerated at a desirable D/U ratio. At this point, signal 16 still contains an AM component, even after sampling, and a more or less undesirable clutter component. Accordingly, a bandpass filter 7 eliminates these components producing a carrier signal frequency-modulated by the sub-signal as shown in FIG. 2(e). The FM carrier signal is then demodulated by a known FM demodulator 8, for example, a discriminator, in order to produce the sub-signal for a final service channel.

As is apparent from the foregoing, since amplitude variations which remain as undesirable clutter components after multiplication and portions containing no phase information are eliminated prior to multiplication, degradation in the D/U ratio due to multiplier limitations, for example, time cross-talk in which an undesirable clutter component arising at a portion containing no phase information exerts an influence on a portion containing phase information after multiplication, is reduced. If the signal is multiplied by $2^N$ by using a snap-off diode or a variable capacitance diode as multiplier 6 and then extracted, then an excellent D/U ratio will be obtained.

It is important, that since the subject matter of the present invention relates to demodulation of an SC sub-signal, a D/U ratio in a reproduced carrier signal should be sufficiently high to secure more than a threshold value of noise in the FM demodulator 8 and the multiplied output should be sufficiently high to satisfy the aforesaid value. This eliminates the need for a circuit for providing an improved carrier signal such as a carrier signal regenerating circuit for demodulation of main signals. Furthermore, where a phase synchronizing (PLL) circuit is used for this purpose as an FM demodulator, the characteristic requirements for the PLL circuit are greatly lessened. In more detail, the significant characteristics required for the carrier signal regenerating PLL circuit for a main-signal demodulator are, for example, C/N (carrier level/noise level) in the corresponding loop, an input frequency shift and the degree of compression of a phase error caused by the superimposed SC sub-signals. Where the PLL circuit is used as a sub-signal demodulator, such characteristics need not be taken into consideration. Only C/N in the loop for synchronizing the PLL circuit needs to be taken into account thereby affording greater freedom in design of a circuit.

According to the present invention, only a minimum amount of circuitry is required and characteristics required for individual elements are greatly relieved.

Thus, a less costly device results while providing excellent SC signal demodulation characteristics. Where the IF repeater is utilized in a long-distance link, since all that is necessary for a repeater station is to demodulate the SC signal alone, freedom of design of a circuit is afforded and reduction in cost is realized.

What is claimed is:

1. A demodulator for a double-modulated carrier signal in which the carrier signal is $2^N$-phase-modulated by a main signal and then frequency-modulated by a sub-signal comprising:

means for extracting a clock component from said double-modulated carrier signal;

means for sampling said double-modulated carrier signal in accordance with the output of said extracting means;

means for limiting an amplitude of the output of said sampling means;

means for frequency-multiplying the output of said limiting means by $2^N$; and, means for demodulating a frequency-modulated signal from said frequency-multiplying means.

* * * * *